March 1, 1955     J. MULLER     2,703,190
APPARATUS FOR MEASURING AND DELIVERING LIQUIDS
Filed Feb. 4, 1953     2 Sheets-Sheet 1
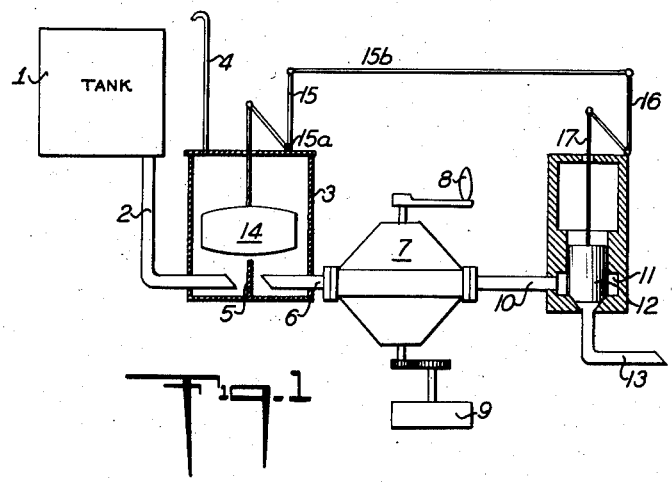
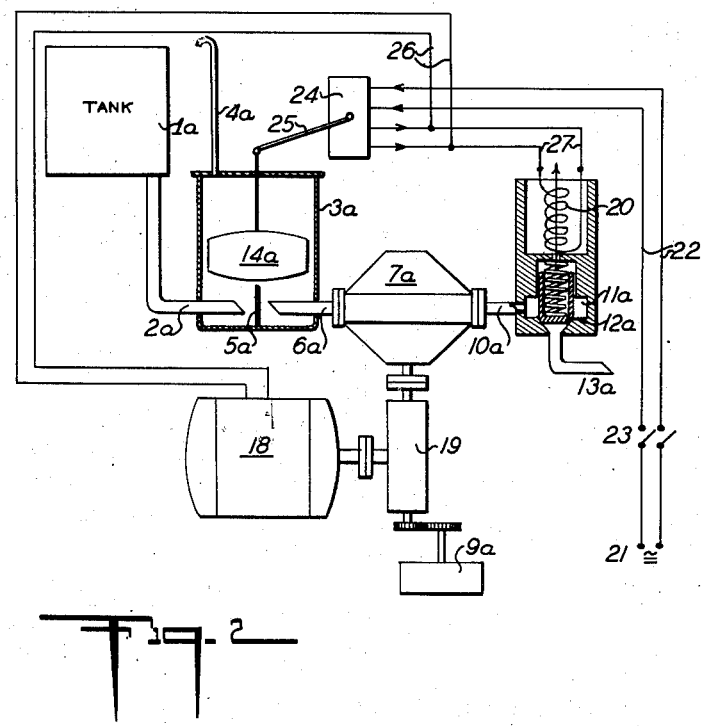
INVENTOR
JACQUES MULLER
BY *Young, Emery & Thompson*
ATTORNEYS

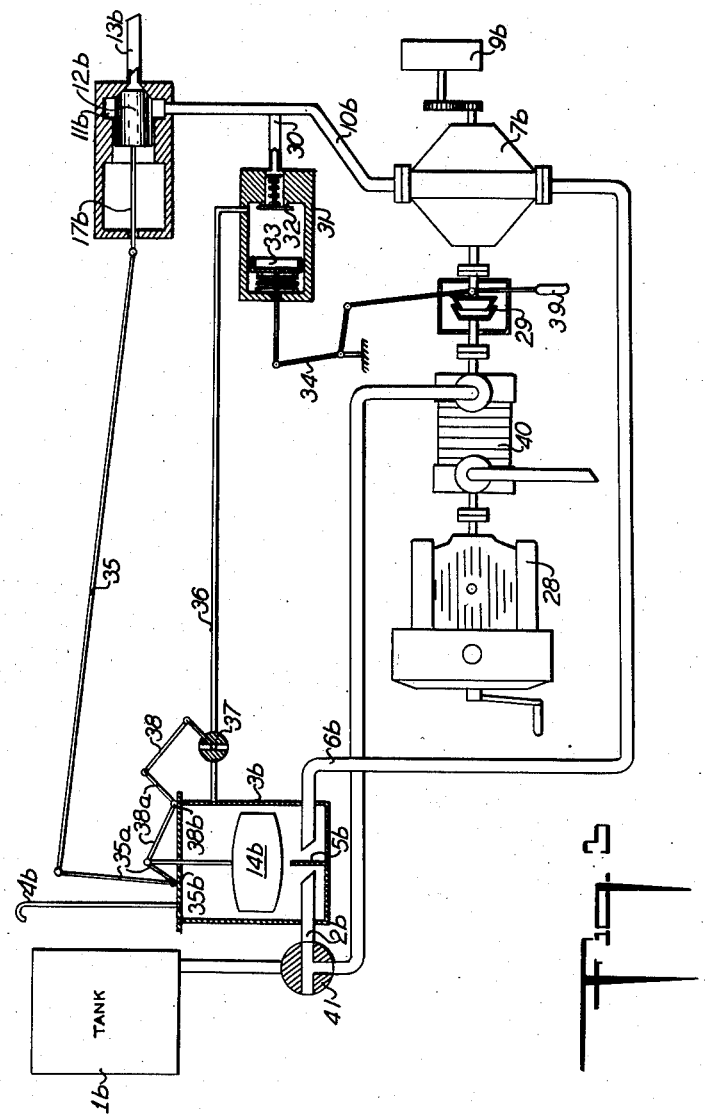

United States Patent Office 2,703,190
Patented Mar. 1, 1955

2,703,190

APPARATUS FOR MEASURING AND DELIVERING LIQUIDS

Jacques Muller, La Garenne-Colombes, France

Application February 4, 1953, Serial No. 335,115

Claims priority, application France February 29, 1952

4 Claims. (Cl. 222—36)

Heretofore, the apparatus currently employed for the distribution and exact measuring of liquids generally comprised a pump of some kind for delivering the liquid to an air separator of appropriate volume capable of effecting total deaeration and allowing the air to escape at intervals through a valve opened by a float whenever the surface of the liquid reached a certain level in the separator.

The liquid on leaving the air separator passed first through a volumetric measuring means which operated a counter for tatalizing the successive volumes distributed, and it then flowed to the place of utilization.

The present invention is based on the fact that a liquid at rest in a vessel is automatically deaerated. It is only necessary to supply this liquid under pressure to a perfectly sealed volumetric pump of known cylindrical volume, without allowing any leakage between the sliding surfaces of these parts of the pump. This pump delivers at each rotation a determined quantity of liquid, therefore, it is only necessary to connect its drive shaft to a counter to indicate the measured amount delivered.

To avoid excitation or operation of the pump in case no liquid should be fed thereto, for example if the supply of liquid is exhausted, an object of the invention is to provide locking or shut-off means actuated by a float which comes into play at the bottom of its path of travel, that is to say, at the minimum permissible level of the liquid supply, for closing a valve in the delivery pipe of the pump, when actuated by hand, thereby preventing operation of this pump owing to the resistance of the liquid stopped by the valve, and by interrupting the circuit of an electric motor used to drive the pump or by declutching the pump if the latter is driven by a heat engine or an internal combustion engine, which then continues to rotate at slow speed. It is also possible to cause the float to act on the ignition of an internal combustion engine, but this of course would make it necessary for the operator to restart the engine after each distribution.

Other objects and features of the invention will be understood from the following description with reference to the accompanying drawings in which:

Figure 1 is a diagrammatic view illustrating a simple embodiment of the invention in which the measuring pump is manually operated;

Figure 2 is a similar view of a similar apparatus in which the pump is actuated by a electric motor; and Figure 3 is another diagrammatic view of an apparatus in which the pump is actuated by a heat engine or an internal combustion engine.

In the embodiment shown in Figure 1, the supply of the liquid to be distributed or delivered and measured is contained in a tank 1, at a high level, the bottom of which is connected by a pipe 2 to the bottom of an air separator 3. The latter comprises a tank closed at the top from which rises a deaerating pipe 4 extending to a level higher than the maximum level of the liquid in the tank 1. The lower portion of the air separator 3 is divided into two compartments by a vertical partition 5 of determined height. The pipe 2 terminates in one of these compartments while the other compartment has leading therefrom a pipe 6 connected to the inlet of a volumetric measuring pump 7 arranged for manual operation by means of a crank 8. The shaft of this volumetric pump is connected by suitable transmission mechanism to a counter 9. The delivery pipe 10 of the pump ends at the housing 11 of a valve in which is arranged a vertical slide valve 12 operable to open or close the opening of a distribution or delivery pipe 13 leading from the housing 11.

The purpose of the partition 5 is to prevent direct passage into the pipe 7 of liquid entering by the pipe 2 into the air separator, and to compel the liquid to rise in the inner compartment before reaching the discharge compartment, which facilitates the liberation and rising of air bubbles.

The air separator 3 contains a float 14 suspended from a rod guided for vertical sliding in the cover of the separator and connected at its upper end to an arm of a bell crank lever 15 pivoted at a fixed point, 15a, and the other arm of which is connected by a rod 15b to a corresponding arm of another bell crank lever 16 pivoted on the top of the housing 11 of the valve. The other arm of the lever 16 is connected by a rod 17 to the slide valve 12. The operation is such that the descending float tends to lower the slide valve and the outlet of the pipe 13 is closed by the slide valve 12 as soon as the level of the liquid reaches the lowest permissible level in the air separator 3.

The operation of this apparatus is as follows:

Assuming that the tank 1 is full of liquid and that the tank of the air separator 3 is also full, with the liquid rising in the pipe 4 to the same level as in the tank 1. The bubbles of air contained in the liquid arriving in the inlet compartment of the separator tend to rise and the air accumulates in its upper portion and finally escapes through the pipe 4. The liquid which passes into the outlet compartment is therefore perfectly deaerated. When the float 14 occupies its most elevated position in the separator, the slide valve 12 is in completely open position in its housing. The volumetric pump 7 being perfectly sealed, no liquid can flow from the separator 3 into the distribution conduit 13. To distribute the liquid, an operator must actuate the pump 7 by means of the crank. Operation of the pump causes the counter to indicate the quantity of the liquid distributed. Even if the slide 11 of the valve remains open, the sealed pump prevents any other passage of liquid. If the liquid should reach the minimum permissible level in the tank 1, and consequently in the air separator, which minimum can be determined by the level of the upper edge of the partition 5, the float will be in its lowermost position while the slide 12 of the valve is applied on its seat so that the discharge orifice of the distribution pipe 13 is closed. It then becomes impossible to operate the pump 7 because the incompressible liquid is blocked in the delivery pipe 10 for the reason that the pump is of the volumetric type. Thus, the pump cannot draw in the remainder of the liquid which occupies the outlet compartment of the air separator, nor can it draw in air. No distribution can take place until the tank 1 and consequently the air separator 3 are filled, in such a manner that the float 14 will rise sufficiently to open the slide 12 of the valve.

In the modification shown in Figure 2, the pump 7a is actuated by an electric motor 18 through a speed reduction gearing 19 to which the counter 9a is also coupled. The slide 12a of the valve is opened by an electromagnet 20. The electric current for this purpose is provided from a source 21 through conductors 22 in which is inserted a manual switch 23 located near the counter 9a. The conductors 22 are connected to a multiple switch 24, the arm 25 of which is connected to the rod of the float 14a, and is connected by conductors 26 to the motor 18 and by conductors 27 to the electromagnet 20. The operation is such that the circuits of the motor 18 and of the electromagnet 20 remain open while the float 14a occupies its lowermost position corresponding to the minimum permissible level of liquid in the air separator 3a, while they remain closed whenever the float rises above this level.

To distribute liquid, it is only necessary to close the switch 23. If the air separator 3a contains a sufficient reserve of liquid to raise the float 14a, the switch causes current to flow to the motor 18 and to the electromagnet 20. The pump can then deliver liquid to the pipe 13a through the open slide valve 12a. As soon as the counter 9a indicates that the desired quantity of liquid has been distributed, the operator opens the switch 23 and interrupts the electric current. The motor 18 stops and the slide valve 12a closes. If there is insufficient reserve of liquid in the separator, the float 14a will be at the bottom of its path of travel and will hold the switch 24 open so that closure of the switch 23 by the operator does not produce any action.

In the modification shown in Figure 3, the pump 7b is driven by an internal combustion engine 28. In this case also the drive of the pump 7b is stopped whenever the slide valve 12b is closed. To achieve this, two methods are contemplated, one by interrupting the ignition circuit of the engine, the other by declutching or uncoupling the drive from the engine to the pump. The first method makes it necessary for the operator to restart the engine for each distribution or delivery. On the other hand, the second method allows the engine to continue running at reduced speed so that an increase in the liquid level in vessel 3b raising of the float 14b will cause the pump to resume operation. The latter method is illustrated in Figure 3. The engine 28 drives the pump 7b through a clutch 29 of suitable type, for example, with mechanical control. To effect disengagement, there may be used the pressure in the delivery pipe of the pump which increases rapidly as soon as the slide valve 12b closes. For this purpose, the delivery pipe 10b is connected by a side conduit 30 through a non-return valve 32 to a diaphragm chamber 31 of as small size as possible. In the illustrated example, the diaphragm chamber consists of a cylinder with a piston 33 urged by a spring and connected to the clutch device 29 by suitable transmission means 34. The operation is such that the coupling or clutch is disengaged when the piston advances under the action of the pressure of the liquid entering the cylinder 31 when the slide valve 12b is closed. This slide valve 12b is closed as in the previous instances by means of a rod 35 shifted by one arm of bell crank lever 35a mounted at 35b when the float 14b is in its lowermost position. The valve 32 prevents return of the liquid into the delivery pipe 12b which has entered the cylinder 31, and this makes it necessary to provide means for actuating this cylinder and retracting the piston in order to engage the clutch 29. For this purpose, the working chamber of the cylinder 31 is connected to the separator 3b by a return pipe 36 in which is inserted a valve 37, the movable member of which is connected to the rod of the float 14b by a link 38, connected to one arm of bell crank lever 38a mounted at 38b. The operation is such that the valve 37 remains open as long as the slide valve 12b of the valve 11b is open and that the two valves are closed simultaneously.

Under these conditions, the operation is as follows:

As long as the float 14b occupies a position above the permissible minimum, the piston 33 is maintained in a position of rest by its restoring spring because the chamber of the cylinder 31 communicates freely with the separator 3b through the open valve 37. The clutch 29 is then engaged and the engine 28 drives the pump 27 which delivers the liquid freely through the open valve 11b to the place of utilization.

If the level of the liquid is reduced to the permissible minimum in the separator 3b, the float 14b at the bottom of its path of travel closes both the slide valve 12b and the valve 37, the pressure rises in the delivery pump 10b, the liquid under pressure opens the valve 32 and enters the cylinder 31. As it cannot return to the separator 3b owing to the presence of the closed valve 37, it operates the piston 33 which disengages the clutch 29 so that the pump 7b stops while the engine 28 continues to run as permitted by the regulator with which it is equipped. If the filling of the tank 1b and the air separator 3b with liquid is completed, the float rises and opens the valves 11b and 37. The piston 33, urged by its spring, forces the liquid through the conduit 36 into the separator and re-engages the clutch so that the pump begins to deliver liquid again. To enable the operator to stop the distribution or delivery at will, for example, when the counter 9b indicates that the desired quantity of liquid has been distributed, it is necessary to provide a control means 39 to operate the clutch. In order that the operator may not be obliged to actuate the piston 33 against the action of its spring at the same time, there may be provided between the control means 39 and the transmission a slide coupling device which will enable the operator to disengage the clutch while leaving the piston 33 in the position of rest, but also preventing the operator from engaging the clutch when the piston has been forced back by the liquid.

To supply liquid to the tank 3b, there may be used a non-volumetric pump 40 with or without a tank 1b and of which the delivery pipe may be connected to the pipe 2b. There may be provided at the place of junction a three-way valve 41 by means of which it is possible to either fill the tank or to pump the liquid directly into the air separator 3b. The counter may also be provided with means for setting the quantity of liquid to be distributed at each operation. The operator then only has to regulate the index of this setting mechanism to the desired number of units. The distribution will be stopped automatically as soon as these units have been delivered.

The embodiments illustrated and described are given by way of example and not limitation, and it will be understood that there are other embodiments possible without departing from the principles of the invention.

Having described my invention, I claim:

1. An apparatus for measuring and delivering liquids comprising an air separator for deaerating the liquid including an inlet duct for supplying liquid to the air separator under pressure, a volumetric pump, means for feeding liquid from the air separator to the pump, a discharge conduit connected to the pump, a counter connected to the pump for counting the volume units of liquid passing through the pump, a valve in the discharge conduit operable for shutting off the flow of liquid therethrough, a float in the air separator, an electric motor for actuating the pump, an electromagnet for actuating the valve, electrical circuits for energizing the motor and magnet, an electric switch for controlling the opening and closing of said circuits, and means actuated by said float for actuating said switch to close the circuits when the float is above a predetermined level and to open the circuits when the float is below the predetermined level.

2. An apparatus for measuring and delivering liquids comprising an air separator for deaerating the liquid including an inlet duct for supplying liquid to the air separator under pressure, a volumetric pump, means for feeding liquid from the air separator to the pump, a discharge conduit connected to the pump, a counter connected to the pump for counting the volume units of liquid passing through the pump, a valve in the discharge conduit operable for shutting off the flow of liquid therethrough, a float in the air separator, means interconnecting the float and valve for opening the valve when the float is raised above a predetermined level by liquid in the air separator, and for closing the valve when the float is below a predetermined level, an engine, means including a disengageable clutch for actuating the pump from the engine, and means responsive to the pressure of the liquid in the discharge conduit for controlling the clutch.

3. An apparatus for measuring and delivering liquids comprising an air separator for deaerating the liquid including an inlet duct for supplying liquid to the air separator under pressure, a volumetric pump, means for feeding liquid from the air separator to the pump, a discharge conduit connected to the pump, a counter connected to the pump for counting the volume units of liquid passing through the pump, a valve in the discharge conduit operable for shutting off the flow of liquid therethrough, a float in the air separator, means interconnecting the float and valve for opening the valve when the float is raised above a predetermined level by liquid in the air separator, and for closing the valve when the float is below a predetermined level, an engine, means including a disengageable clutch for actuating the pump from the engine, a hydraulic clutch actuator, resilient means urging the clutch to engaged position, means supplying liquid under pressure from the discharge conduit to the hydraulic clutch actuator, a check valve in said last mentioned means, a duct placing the hydraulic clutch actuator in communication with the air separator, a valve in said duct, and means for actuating said last mentioned valve by said float for opening the valve in the duct when the float is above said predetermined level.

4. An apparatus according to claim 3 in which manually actuated means are provided for disengaging the clutch while the clutch actuator is in clutch engaging position.

References Cited in the file of this patent

UNITED STATES PATENTS

| | | |
|---|---|---|
| 1,956,656 | Rush et al. | May 1, 1934 |
| 2,006,135 | Gibbs | June 25, 1935 |
| 2,138,755 | Bechtold | Nov. 29, 1938 |
| 2,164,441 | Bechtold | July 4, 1939 |
| 2,303,378 | Moody | Dec. 1, 1942 |